July 2, 1963 T. W. JANSEN ETAL 3,095,814
DISPENSING APPARATUS
Filed June 30, 1960 2 Sheets-Sheet 1
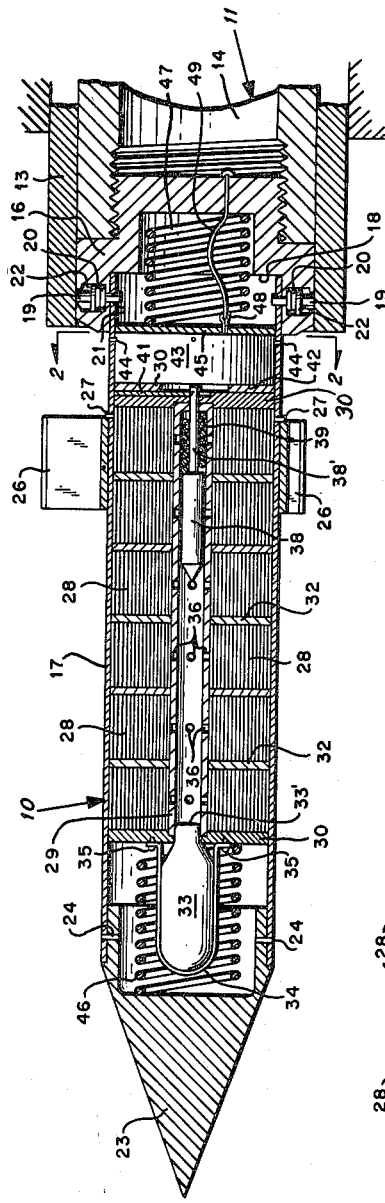
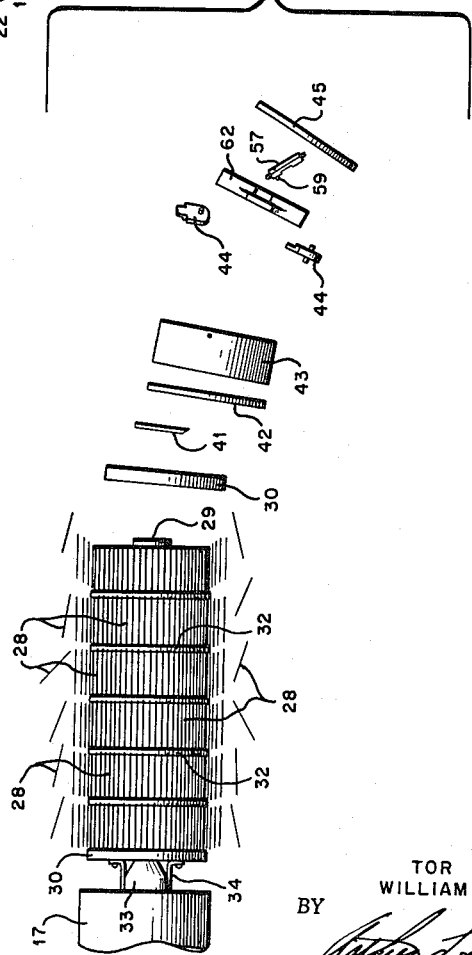
INVENTORS
TOR W. JANSEN
WILLIAM B. WALKER
BY
ATTORNEY

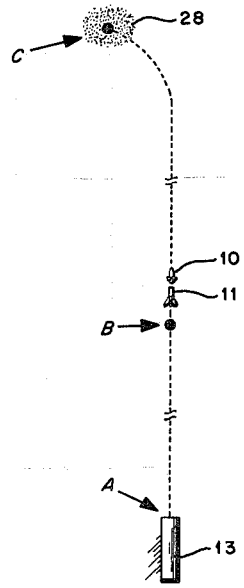
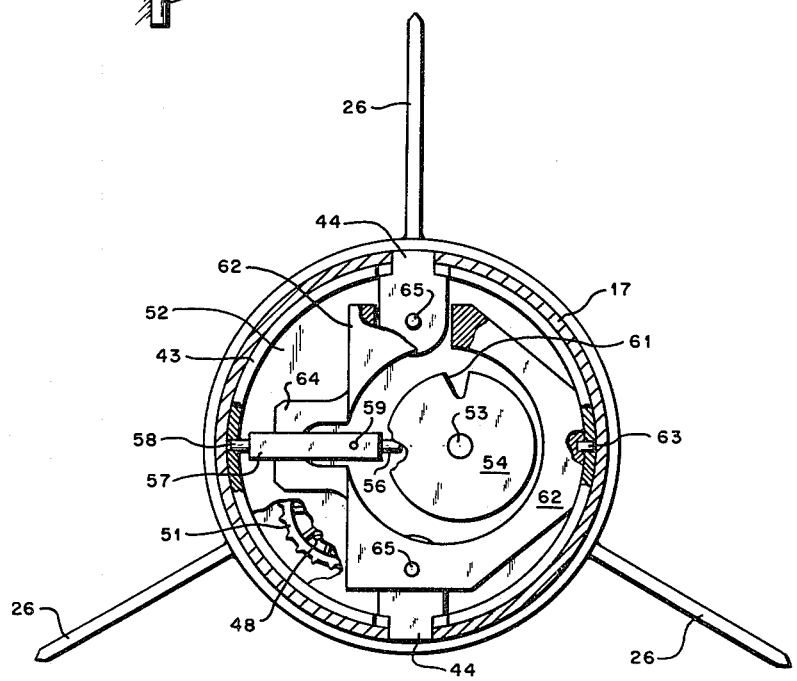

3,095,814
DISPENSING APPARATUS

Tor W. Jansen, Southampton, and William B. Walker, Hatboro, Pa., assignors to the United States of America as represented by the Secretary of the Navy
Filed June 30, 1960, Ser. No. 40,114
9 Claims. (Cl. 102—49)
(Granted under Title 35, U.S. Code (1952), sec. 266)

The invention described herein may be manufactured and used by or for the Government of the United States of America for governmental purposes without the payment of any royalties thereon or therefor.

The present invention relates to automatic dispensing apparatus for use in airborne objects and more particularly to apparatus for ejecting radar reflecting chaff from a moving airborne object and enabling its effective dispersion into the air or space at a predetermined point along the path of travel of the object.

In the development, experimentation and application of rockets and guided missiles it is frequently desired to dispense automatically objects from a projectile at a predetermined point in time or position along its trajectory or path of travel whereby additional functions are subsequently performed by virtue of the ejected objects. It is not uncommon for the projectile to contain fragile and delicate mechanical or electronic components which may be destroyed by the severe shock imparted by heretofore known dispensing methods. Conversely, too small a dispensing force does not assure positive dispensing of sufficient reliability to offset the reduction in malfunctioning of components caused by the shock. Dispensers employing explosives are often prohibited for the additional reason that they create hazardous conditions in otherwise safe environments.

One such subsequently performed additional function of the ejected objects used in rocketry and meteorological studies is in providing a positive radar target at long range which is indicative of the path of the projectile, wind velocity, and air density. However, tracking of a projectile or observing motion of small airborne objects under existing radar capabilities has become more and more difficult as higher altitudes and increased ranges are attained by rockets and guided missiles.

Accordingly, it is an object of the present invention to provide a very simple, inexpensive and improved dispensing apparatus for an airborne projectile with which objects can be ejected from the projectile shell positively and with the minimum of shock to any components within the shell or to the objects themselves, and with which occurrence of the dispensing event can be predetermined at any point in the trajector or flight path of the projectile.

Another object of the invention is to provide a novel dispenser and dispersion apparatus for an airborne projectile with which radiant energy reflecting metallic particles, known as chaff, are quickly and widely scattered at a high altitude or at long range so that an effective radar target is promptly obtained; with which radiosonde equipment or the like can be simultaneously dispensed therewith; with which the drift and descent rates of any chaff dispersed enables determination of the flight path, of wind velocity and of air density; and with which target confusion as a military countermeasure can be created to deceive homing-type missiles.

And still another object of the invention is to provide a dispensing and ejecting apparatus for an airborne projectile which is compact and of a simplified construction and which can be safely handled, stored or transported without hazard of premature firing and explosion.

Various other objects and advantages will be apparent from the following description of one embodiment of the invention and the novel features will be particularly pointed out hereinafter in connection with the appended claims.

In the accompanying drawings:

FIG. 1 represents a longitudinal cross sectional view of a rocket including a dispensing apparatus of the present invention with its propelling motor inserted in a launcher tube;

FIG. 2 represents a rear view partially in cross-section of the timing mechanism in the rocket taken along the line 2—2 of FIG. 1;

FIG. 3 graphically represents the dispensing event occurring along the flight path of the rocket; and FIG. 4 represents an instantaneous and fragmentary view of the dispensing apparatus as chaff is being scattered at a predetermined point in the trajectory path of the rocket.

In the illustrated embodiment of the invention, a rocket is indicated generally by a nose cone assembly 10 mechanically coupled to a propelling motor such as a reaction motor 11, shown only by a fragment of its forward portion. A launcher for the rocket may be of any conventional type such as the one shown by a cylindrical launcher tube 13. The motor 11 has a cylindrical motor casing 14 closed at the fore-end by a cylindrical coupling 16 recessed on its forward side and threadably fixed in the casing 14 so that both the casing 14 and the coupling 16 are formed to slide within the launcher tube 13. A nose cone shell 17, coaxially disposed in tandem with and forward of the motor casing 14, seats against a shoulder 18 in the recessed portion of the coupling 16 thereby imparting a forward thrust to the nose cone assembly 10 from the motor 11 when the latter is activated. A pair of retaining pins 19 contained in and oppositely disposed at the circumference of the coupling 16 have their end-to-end axes aligned radially with respect to the axes of the shell 17 and the coupling 16. The retaining pins 19 are urged by a pair of retaining pin springs 20 radially outward through a corresponding pair of apertures 21 in the shell 17 until they abut the bore of the launcher tube 13. The retaining pin springs 20 are pre-loaded and disposed between the coupling 16 and retaining pin flanges 22. As shown in FIG. 1, the retaining pins 19 maintain a locking connection between the shell 17 and the coupling 16 until the rocket is fired from the launcher tube 13. The retaining pins 19 are then free to slide radially outward due to the spring force of retaining pin springs 20 and thereby unlock the connection between the shell 17 and the coupling 16. The nose cone assembly 10 thereafter remains seated in the coupling 16 due only to the thrust of the motor 11 against the shell 17 at the shoulder 18.

The shell 17 is streamlined at its fore-end by a conical portion 23 which is fixed to the shell 17 by convenient means such as pins 24. A fin-type stabilizer assembly 26 is slidably mounted about the shell 17 to provide aerodynamic stability to the nose cone assembly while in flight. Stops 27 protruding radially from the shell 17 near the rear-end of the nose cone assembly 10 prevent the stabilizer 26 from sliding off the shell 17 while in flight.

The embodiment shown in the drawing is adapted for dispensing small, thin metal strips, shown as chaff and shown generally by the numeral 28, which is used for obtaining a radar target. It is understood, of course, that the material or object dispensed from the rocket is for illustrative purposes only and is not intended to limit the scope of the invention to the precise material or object shown. For example, the objects may be a parachute, electronic gear, leaflets, chemical powders, liquids and gases, or any combination thereof.

The chaff 28 is packed in a spool-like assembly which is entirely contained and slidable endwise in the shell 17 and which is defined by an elongated hollow conduit 29 with concentrically positioned annular rings 30 fixed at each end thereof. The chaff 28 may be packed in segments partitioned along the conduit 29 by a plurality of annular separators 32 for assuring less resistance to dispersion caused by intertwined chaff strips. A sealed container 33 of compressed gas is secured to the anterior ring 30 by a bracket 34 and screws 35. The container 33 is coaxial with the conduit 29 and has a soft puncturable seal 33' facing rearward through the anterior ring 30 into the conduit 29. A plurality of ports 36 spaced throughout the length of conduit 29 provide gas escape means from the conduit 29 when the seal 33' is punctured and emits compressed gas from the container 33. The escaping gas provides a jet effect that causes the chaff 28 to uniformly disperse in a large space.

The rear-end of the conduit 29 contains a lance or actuating means 38 pointed on its fore-end which is slidable therein and is urged toward the fore-end of the conduit 29 by a lance spring 39. A notched extension rod 38' on lance 38 extends rearward and out of the posterior ring 30 and engages a latch 41 thereby maintaining the lance spring 39 compressed between the lance 38 and the posterior ring 30.

The above-described spool-like assembly is urged rearwardly by an ejector spring 46 compressed between the conical portion 23 and the anterior ring 30, but is contained in the shell 17 by a timer housing 43. The housing 43 is concentric with and slidable in the shell 17, but resists the ejecting force of the ejector spring 46 through a pair of retractable lugs 44 which radially extend into corresponding recessed notches or holes in the shell 17. The latch 41 is held in the latched position with lance extension rod 38' by the compression force exerted between the posterior ring 30 and the fore-end of the timer housing 43. A spacer ring 42 is disposed between the posterior ring 30 and the housing 43. A separating spring 47 compressed between the coupling 16 and a timer housing cover plate 45 assures positive separation of the nose cone assembly 10 from the motor 11 when the pushing force of the motor 11 ceases.

The lugs 44 which contain the timer housing 43 and the spool-like assembly in the shell 17 are retracted from the shell 17 upon termination of a predetermined time interval. A removable cog 48 connected to the coupling 16 by a lanyard wire 49 blocks the timer mechanism until the pushing force of the motor 11 quits and the force of separating spring 47 disengages the coupling 16 from the shell 17 whereupon the cog 48 is removed and the timing interval is initiated.

The timer is shown in more detail in FIG. 2 in which the timer elements are illustrated in a position before timing is initiated. The clock mechanism used in the timer housing 43 may be of any conventional spring-wound type having at least one part which may be engaged by the cog 48 to prevent operation of the mechanism. In the illustrated embodiment, the clock mechanism includes a spoked gear 51 positioned next to a partition 52 which is fixed to the timer housing 43. When the clock spring (not shown) of the clock mechanism is wound, the gear 51 is blocked against movement by the cog 48 extending through the partition 52 and between two spokes of the gear 51. Removal of the cog 48 will initiate the timing cycle.

A cam shaft 53 connected to a constant rotation rate output element in the clock mechanism extends through the partition 52 and has a timing cam 54 coaxially fixed to the outer end for rotation therewith. The cam 54 is rearwardly offset from the partition 52 whereby the space therebetween accommodates a bar stud 56 longitudinally extending beyond one end of a latch bar 57. The bar 57 is loosely inserted in a hole in the timer housing 43 by a bar stud 58 longitudinally extending beyond the other end of the bar 57. A third bar stud 59 extends laterally from the bar 57 and forward into a mating hole in partition 52 to secure the bar 57 against movement in a plane parallel to the partition 52 as may otherwise occur when cam 54 rotates. A peripheral notch 61 in cam 54 is angularly disposed with respect to the stud 56 an amount depending on the timing interval desired, and is of sufficient dimension to free stud 56 when aligned therewith.

A collar 62, in turn, is removably fixed in relation to the timer housing 43 by a collar stud 63 at one end loosely inserted in a mating hole in the housing 43. The opposite end of the collar 62 may be characterized as a yoke 64 which is retained against the partition 52 by the latch bar 57. The retractable lugs 44, which have their outer ends inserted in the shell 17 for resisting the ejecting force of spring 46 until the timing interval is terminated, are held against the partition 52 at the inner ends thereof by virtue of their being disposed between lateral portions of the collar 62. Lug pins 65 fixed to the lugs 44 loosely protrude into corresponding holes in the lateral portions of the collar 62 for preventing relative movement of the lugs 44 and the other timer elements until the timing interval is terminated.

It should be noted that the ejector spring 46 presents a biasing force against the rearward side of the outer ends of the lugs 44 which urges the inner ends against the collar 62. This urging force, in turn, tends to rotate the collar 62 about pin 63, but the latch bar 57 prevents it due to the latter being secured by studs 56 and 58 at the cam 54 and the housing 43, respectively.

The operation of the invention is summarized as follows. Prior to firing the rocket, it is assembled with the clock mechanism wound and blocked by the cog 48 with the cam 54 set at an angular position corresponding to a desired timing interval; and it is placed in the launcher tube 13 with the retaining pins 19 inserted through the coupling 16 and the shell 17.

A postulated trajectory or flight path of the rocket is illustrated in FIG. 3 by the broken line A—B—C. At the instant the rocket leaves the launcher tube 13 on activating the motor 11 at point A, the retaining pins 19 are urged out of the shell 17 thereby unlocking the connection between the coupling 16 and the shell 17 but the latter elements remain in contact due to the pushing action of the motor 11 against the shell 17.

At point B, where the motor propulsion ceases, the motor 11 begins to decelerate at a rate considerably greater than that of the nose cone assembly 10 due to the difference in aerodynamic designs. Hence, the motor 11 will depart from the assembly 10 at some point between points B and C. Positive separation is assured by the compressive force of separating spring 47 between the motor 11 and the assembly 10.

As the separation occurs, the lanyard wire 49 pulls cog 48 from the gear 51 and partition 52 to unblock the clock mechanism thereby initiating the timing interval. The nose cone assembly 10 continues along the flight path until the timing interval terminates at point C whereupon chaff dispensing is effectuated. It is contemplated that the timing can be set for any interval to effect dispensing. For example, a useful interval for determining the maximum altitude reached by a vertically directed rocket will terminate at its apogee.

When the clock mechanism becomes unblocked, the cam 54 begins to rotate at a constant rate until the notch 61 is aligned with the stud 56 on the latch bar 57. This aligned position permits the collar 62 to pivot about the stud 63 to release the inner ends of the retractable lugs 44. The outer ends of the lugs 44 are thereby free to turn forward relative to the shell 17 and retract into the timer housing 43. Recesses, not shown, at the surface of the housing 43 forward of and next to the lugs 44 may be added to assure complete lug retraction from the shell 17.

The timer housing 43 and the spool-like assembly are thus free to slide out the rear-end of the shell 17 at the urging of ejector spring 46. There being no mechanical connection between the timer housing 43 and the posterior ring 30, they separate and permit the latch 41 to disengage the notched extension rod 38'. The lance 38 is thus free to propel forward due to the force of the lance spring 39 and puncture the seal 33. The gas pressure in the container 33 exerts a sufficient pressure at the point of the lance 38 to drive it rearward again. As depicted in FIG. 4, the compressed gas escapes from the container 33 into the conduit 29 and forms a plurality of radially directed jets of gas through the ports 36 thereby producing a turbulent dispersion of the chaff 28 over a large space and establishing a radar target readily discernible with present radar facilities.

It should be noted that the chronology of events at termination of the timing interval and the inertial effects of the numerous elements will assure that the spool-like assembly is completely ejected from the shell 17 before the gas jet dispersion occurs.

It should be further noted that the various forces occurring as by the compression springs and the gas emission are relatively low but sustained over a long period. Hence, the energy release may be of a large amount for achieving positive and efficient ejection and dispersion of the material or objects acted upon without danger of destroying or injuring delicate and fragile components which may be present.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. A device for providing a radar target by means of dispensed metallic chaff along the flight path of a projectile which comprises: a shell, a motor releasably coupled to the rear-end of said shell for propelling it and automatically uncoupling itself therefrom when the pushing power of said motor ceases, adapter stud means for normally locking said shell to said motor while said projectile is disposed in a launcher tube but unlocking said shell when said projectile is fired from the launcher tube, a timer releasably secured in said shell and means on said timer for activating said timer when said motor and shell are separated, spool means for confining the metallic chaff disposed and slidable endwise in said shell, said spool means confined in said shell by said timer and having a perforated conduit from end to end thereof, a source of compressed gas fixed on the forward end of said spool means, first force exerting means at the forward end of said shell and operable on said spool means and said timer to eject said timer and said spool means from said shell, an element slidable in said conduit from end to end thereof and operable when it reaches the forward end of said conduit to cause a release of the gas from said source, second force exerting means carried by said spool means and operable on said element when free to be propelled along said conduit to engage said source of gas and cause a release of the gas, latch means holding said element at the rear-end of said conduit controlled by said timer and operable when said timer separates from said shell to release said element; whereby when said projectile reaches a point in its flight where said motor ceases its propulsion and separates from said shell said timer will uncouple itself from said shell a selected time interval thereafter and release said element, said element will be propelled along the conduit to cause a release of the gas, and said first force exerting means will eject said spool means from said shell and enable escape into the ambient space of the chaff confined by said shell in said spool means and around said conduit, with the gas dispersing the chaff from said spool means to reflect a maximum number of radio waves.

2. A device for providing radiant energy reflecting particles along the flight path of a projectile which comprises: a shell, a motor releasably coupled to the rear-end of said shell for propelling it and automatically uncoupling itself therefrom when the pushing power of said motor ceases, a timer releasably secured in said shell and means on said timer for activating said timer when said motor and shell are separated, spool means for confining the particles disposed and slidable endwise in said shell, said spool means confined in said shell by said timer and having a perforated conduit from end to end thereof, a source of compressed gas fixed on the forward end of said spool means, first force exerting means at the forward end of said shell and operable on said spool means and said timer to eject said timer and said spool means from said shell when released by separation of said timer, a member slidable in said conduit from end to end thereof and operable when it reaches the forward end of said conduit to cause a release of gas from said source, second force exerting means carried by said spool means and operable on said member when free to be propelled along said conduit to engage said source of gas and cause a release of the gas, latch means holding said member at the rear-end of said conduit controlled by said timer and releasing said member when said timer separates from said shell, whereby when said projectile reaches a point in its flight where said motor ceases its propulsion and separates from said shell said timer will uncouple itself from said shell a selected time interval thereafter and release said member, said member will be propelled along said conduit to cause a release of the gas, and said first force exerting means will eject said spool means from said shell and enable escape into the surrounding space of the radiant energy reflecting particles confined by said shell in said spool means and around said conduit, with the gas uniformly dispersing the particles from said spool means to reflect a maximum amount of radiant energy.

3. A device for ejecting and dispersing particles from a projectile which comprises: a shell, a motor releasably coupled to the rear-end of said shell for propelling it and automatically uncoupling itself therefrom when the pushing power of said motor ceases, a timer releasably secured in said shell and means on said timer for activating said timer when said motor and shell are separated, conduit means disposed and slidable endwise in said shell, said conduit means confined in said shell by said timer and perforated from end to end thereof, a source of compressed gas fixed on the forward end of said conduit means, first force exerting means at the forward end of the shell and operable on said conduit means and said timer to eject said conduit means and said timer from said shell, a member slidable in said conduit means from end to end thereof and operable when it reaches the forward end of said conduit means to cause a release of gas from said source, second force exerting means carried by said conduit means and operable on said member when free to be propelled along said conduit to engage said source of gas and cause a release of the gas, latch means holding said member at the rear-end of said conduit means controlled by said timer and releasing said member when said timer separates from said shell to release said member; whereby when said projectile reaches a point in its flight where said motor ceases its propulsion and separates from said shell said timer will uncouple itself from said shell a selected time interval thereafter and release said member, said member will be propelled along said conduit means to cause a release of the gas, and said first force exerting means will eject said conduit means from said shell and enable escape from said conduit means of the particles packed around said conduit means, with the gas uniformly dispersing the particles into the surrounding space.

4. A device for dispensing an object in the flight path of a projectile which comprises: a shell, a propellent motor releasably coupled to the rear-end of said shell for propelling it and automatically uncoupling itself therefrom when the pushing power of said motor ceases, a timer releasably secured in said shell and means on said timer for activating said timer when said motor and shell are seperated, said object confined in said shell by said timer and disposed and slidable endwise in said shell, force exerting means at the forward end of said shell and operable on said object and said timer to eject both said timer and said object from the shell; whereby when said projectile reaches a point in its flight where said motor ceases its propulsion and separates from said shell said timer will uncouple itself from the shell a selected time interval thereafter and release said object, and said force exerting means will eject said object from said shell into the ambient space.

5. In a projectile in which its nose cone shell and propelling motor automatically uncouple from each other when the pushing power of the motor during flight ceases, apparatus for providing a radar target in its flight path comprising: a timer releasably secured in the shell and means on said timer for activating said timer when said motor and shell are separated, spool means slidable endwise in the shell and confined therein by said timer, said spool means having a perforated conduit from end to end thereof, a source of compressed gas fixed to the forward end of said spool means, first force exerting means fixed to the forward end of said spool means positioned to operate on the shell and said timer to eject said spool means and said timer when released by separation of said timer from the shell, a member slidable in said conduit from end to end thereof and operable when it reaches the forward end of said conduit to cause a release of gas from said source, second force exerting means carried by said spool means and operable on said member when free to be propelled along said conduit to engage said source of gas and cause release of the gas, latch means holding said member at the rear-end of said conduit controlled by said timer and releasing said member when said timer separates from the shell to release said member; whereby when the projectile reaches the point in its flight where the motor uncouples and separates from the shell said timer will unsecure itself from the shell a selected time interval thereafter and release said member, said member will be propelled along said conduit to cause a release of the gas, and said first force exerting means will eject said spool means from the shell and enable escape into the surrounding space of the radar target confined in said spool means and around said conduit, with the gas dispersing the target from said spool means.

6. In a projectile in which its nose cone shell and propelling motor automatically uncouple from each other when the pushing power of the motor ceases during flight, apparatus for providing a radiant energy reflecting target in its flight path, comprising: a timer releasably secured in the shell and means on said timer for activating said timer when said motor and shell are separated, spool means slidable endwise in the shell and confined therein by said timer, said spool means having a perforated conduit from end to end thereof, a source of compressed gas fixed to the forward end of said spool means, first force exerting means fixed to the forward end of said spool means positioned to operate on the shell and said timer to eject said spool means and said timer when released by separation of said timer from the shell, a member slidable in said conduit from end to end thereof and operable when it reaches the forward end of said conduit to cause a release of gas from said source, second force exerting means carried by said spool means and operable on said member when free to be propelled along said conduit to engage said source of gas and cause release of the gas, latch means holding said member at the rear end of said conduit controlled by said timer and releasing said member when said timer separates from the shell to release said member; whereby when the projectile reaches the point in its flight where the motor uncouples and separates from the shell said timer will unsecure itself from the assembly a selected time interval thereafter and release said member, said member will be propelled along said conduit to cause a release of the gas, and said first force exerting means will eject said spool means from the shell and enable escape into the surrounding space of the radiant energy reflecting particles confined in said spool means and around said conduit, with the gas dispersing the target from said spool means to reflect a maximum amount of radiant energy.

7. In a projectile in which its nose cone shell and propelling motor automatically uncouple from each other when the pushing power of the motor ceases during flight, apparatus for ejecting and dispersing particles from the assembly in its flight path, comprising: a timer releasably secured in the shell and means on said timer for activating said timer when said motor and shell are separated, hollow conduit means slidable endwise in the shell and confined therein by said timer, said conduit means being perforated from end to end thereof, a source of compressed gas fixed to the forward end of said conduit means, first force exerting means fixed to the forward end of said conduit means positioned to operate on the shell to eject said conduit means when released by separation of said timer from the shell, a member slidable in said conduit means from end to end thereof and operable when it reaches the forward end of said conduit means to cause a release of gas from said source, second force exerting means carried by said conduit means and operable on said member when free to be propelled along said conduit means to engage said source of gas and cause release of the gas, latch means holding said member at the rear end of said conduit means controlled by said timer and releasing said member when said timer separates from the shell to release said member; whereby when the projectile reaches the point in its flight where the motor uncouples and separates from the shell said timer will unsecure itself from the assembly a selected time interval thereafter and release said member, said member will be propelled along said conduit to cause a release of the gas, and said first force exerting means will eject said conduit means from the shell and enable escape from said conduit means of the particles packed around said conduit means, with the gas uniformly dispersing the particles into the surrounding space.

8. A device for uniformly dispersing chaff from a closely packed arrangement thereof, comprising: a spool having its coaxial end-wall members connected by a hollow coaxial conduit perforated throughout its length, a source of compressed gas fixed at one end of said conduit, an actuating means slidable in said conduit from end to end for causing a release of the gas from said source when said actuating means reaches said one end of said conduit, force exerting means carried by said spool and operable on said actuating means for propelling the actuating means along said conduit to engage said source of gas and cause a release of the gas, latch means holding said actuating means at the other end of said conduit and releasing said actuating means; whereby when said latch means is removed said member will be propelled along said conduit to cause a release of the gas and enable escape from the spool of the chaff packed around said conduit, with the gas uniformly dispersing the chaff into the surrounding space.

9. A device for uniformly dispersing small particles from a closely packed arrangement, comprising: a hollow conduit perforated throughout its length, a source of compressed gas fixed at one end of said conduit, an actuating means slidable in said conduit from end to end thereof for causing a release of the gas from said source when it reaches said one end of said conduit, force exerting means carried by said conduit and operable on said actuating means for propelling said actuating means along said conduit to engage said source of gas and cause a release of the gas, latch means releasably holding said actuating means at the other end of said conduit and operable to release said actuating means; whereby when said latch means is removed said actuating means will be propelled along said conduit to cause a release of the gas and dispersion of the particles packed around said conduit, with the gas uniformly scattering the particles in the surrounding space.

References Cited in the file of this patent

UNITED STATES PATENTS

| | | |
|---|---|---|
| 1,621,421 | Kunzer | Mar. 15, 1927 |
| 2,476,302 | Jeppson | July 19, 1947 |

OTHER REFERENCES

Astronautics, vol. 3, No. 12, December 1958, pages 21 and 27, article titled "Space Beacon." (Copy in Div. 10, 102–49.)